Sept. 18, 1956     D. FIRTH     2,763,158
CONVEYOR PULLEYS
Filed April 2, 1954     3 Sheets-Sheet 3
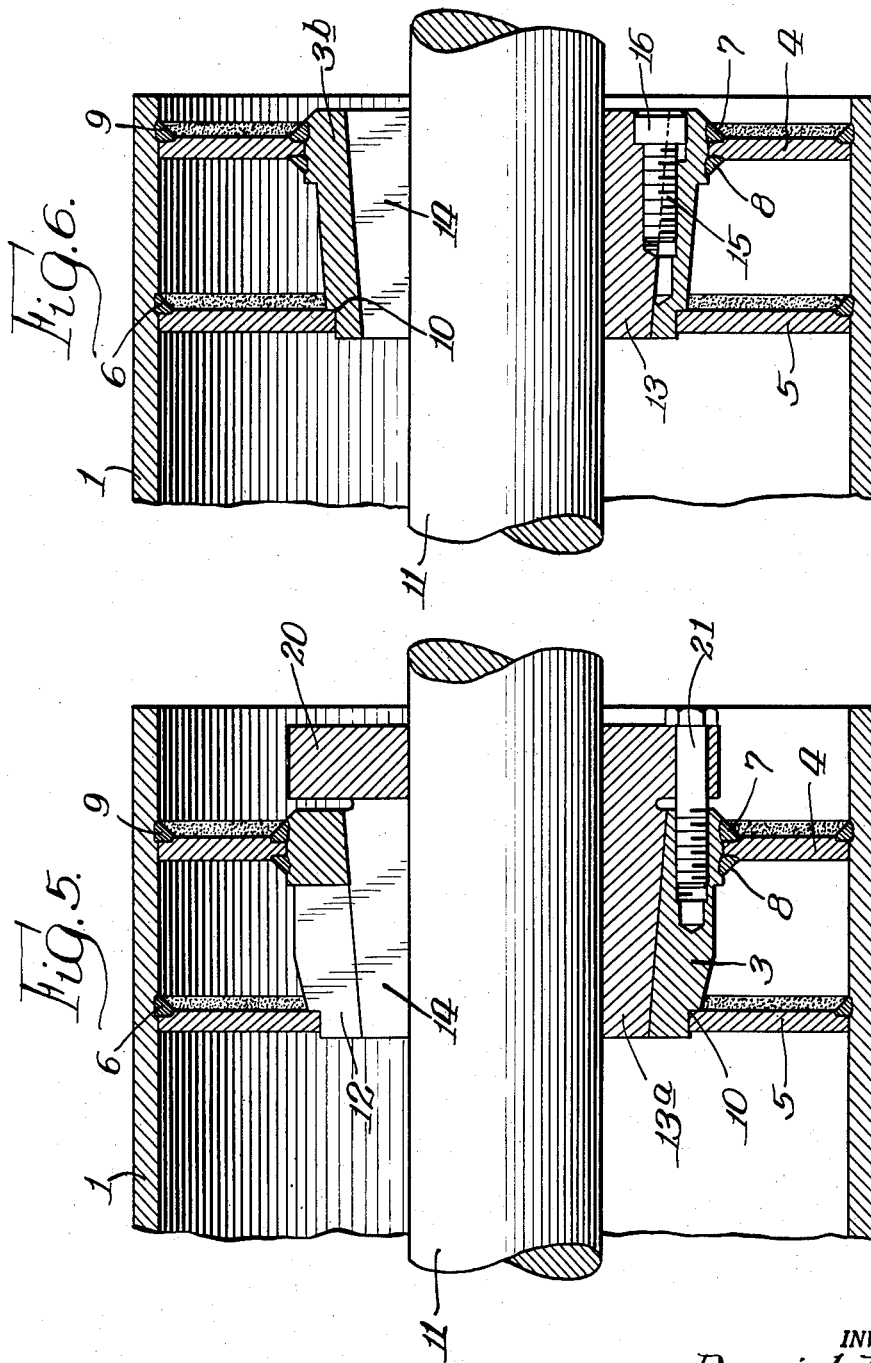
INVENTOR.
David Firth,
BY
Osgood H. Dowell
Atty.

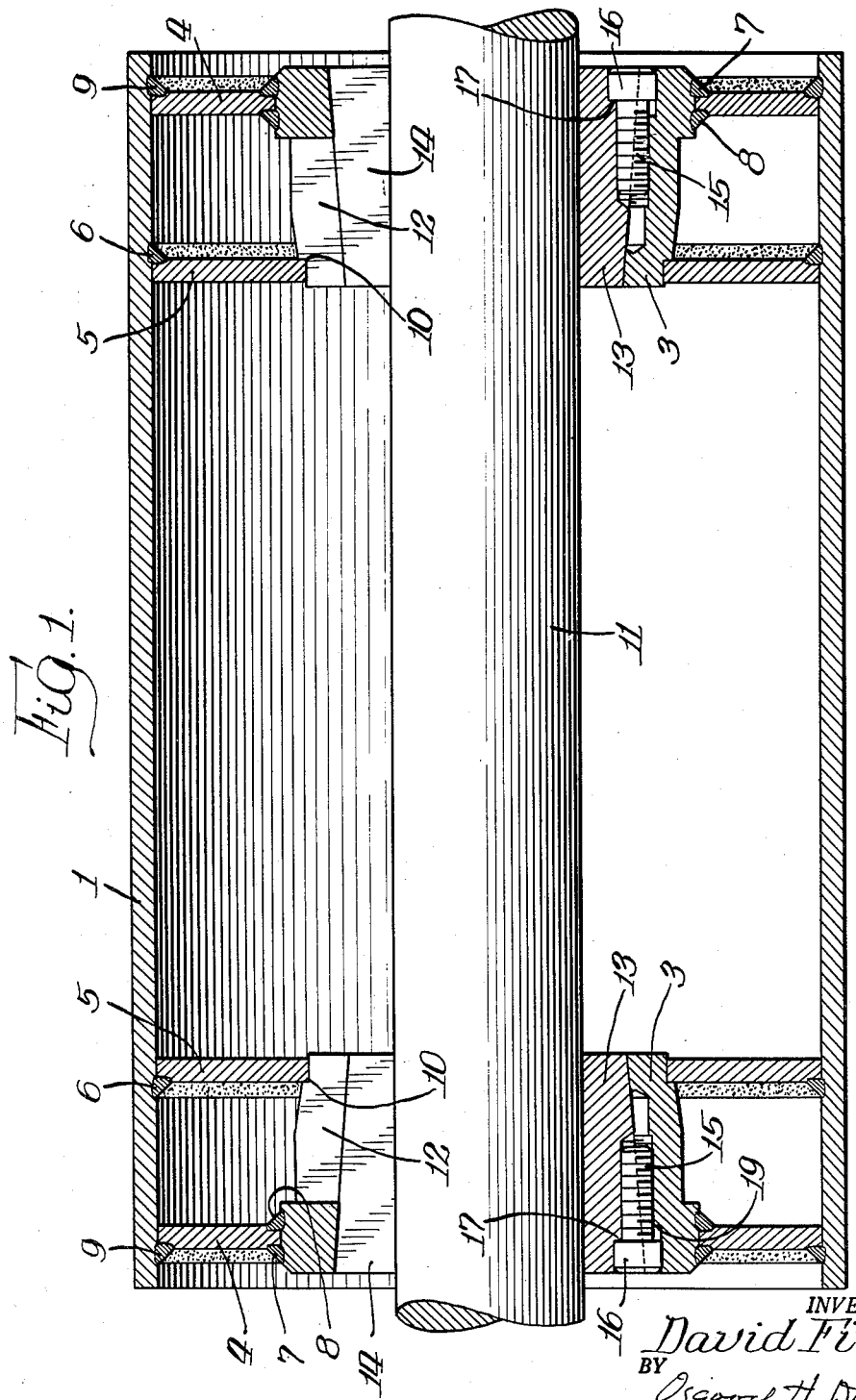

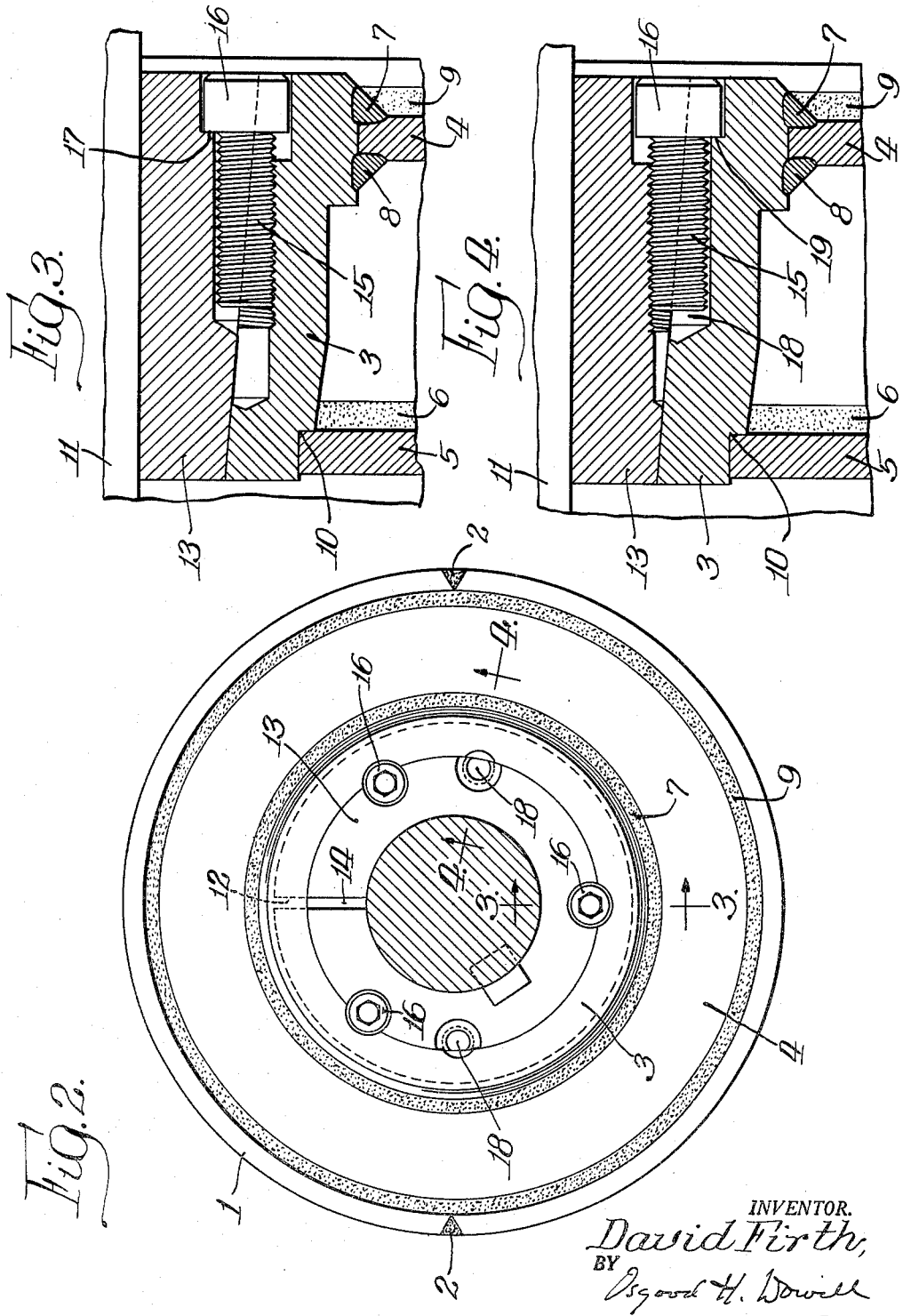

United States Patent Office 2,763,158
Patented Sept. 18, 1956

2,763,158

CONVEYOR PULLEYS

David Firth, South Bend, Ind., assignor to Dodge Manufacturing Corporation, Mishawaka, Ind., a corporation of Indiana Application April 2, 1954, Serial No. 420,706

7 Claims. (Cl. 74—230.3)

A conveyor pulley of known type comprises a cylindric shell constituting the rim, twin hubs within the rim, and annular discs connecting with the rim to the hubs, said discs being fixed on the hubs and welded to the rim. The rims of such pulleys are usually of heavy gauge sheet metal or rolled steel plate, though they are also made in some cases from commercial tubing. The discs are usually cut from steel plate.

The present invention aims to provide a pulley of the above-indicated type of a novel construction practicable for manufacture, easy to apply to a shaft, and which in operative service is highly resistent to distortion by deflection of the pulley shaft under imposed loads, with the effect of minimizing canting of the hubs and consequent bending stresses in the discs.

In a pulley embodying the invention, each hub is connected to the rim by a pair of annular discs in spaced relation. The discs adjacent to the outer ends of the hubs are referred to as the outer discs, and those adjacent to the inner ends of the hubs are referred to as the inner discs. The outer discs are welded to the hubs and to the rim. The inner discs, which are fitted on the inner end portions of the hubs, are welded only to the rim. The hubs are interiorily tapered and attached to the pulley shaft by wedging tapered split contractible bushings between the hubs and shaft, the wedging being effected by tightening screws connecting the bushings to the hubs. The hubs are expansible by the wedging of the bushings, so that, when the hubs are attached to the shaft by tight wedging of the bushings, the inner end portions of the hubs exert outward pressure against the inner discs fitted thereon. Thus in operative use of the pulley, each hub and disc assembly, together with the surrounding portion of the rim, constitutes a rigid annular box-like structure, whereby the rim and hubs are reinforced and the hubs are held so rigidly as to minimize canting and consequent bending stresses in the discs.

The invention includes a species in which the inner end portions of the hubs fit slidably in the inner discs and the hubs are split longitudinally for at least substantial distances from their inner ends, so that by tight wedging of the bushings the hubs are expanded to grip the inner discs. In another species, the inner end portions of the hubs fit tight in the inner discs, and the hubs, being solid or unsplit, are sufficiently slenderized or thin-walled to be somewhat expansible by the tight wedging of the bushings, so that when the bushings are tightly wedged the inner end portion of the hubs exert outward pressure in and against the inner discs.

Each of the species mentioned gives high strength and rigidity. Furthermore, the invention permits utilization of straight or flat discs, as is desirable, and permits welding the inner discs to the rim before placing the outer discs and hubs within the rim, thus avoiding the difficulty and expense that would be incident to welding the inner discs to the rim after the outer discs are inserted.

In the accompanying drawings:

Fig. 1 is a longitudinal section of a pulley embodying the species of the invention hereinbefore first mentioned.

Fig. 2 is an end elevation of said pulley.

Fig. 3 is a detail section taken on the line 3—3 of Fig. 2, showing one of the screws for wedging the bushing.

Fig. 4 is a detail section taken on the line 4—4 of Fig. 2, showing one of the screws arranged for dewedging the bushing.

Fig. 5 is a longitudinal section of an end portion of a pulley embodying the same species of the invention as in Fig. 1 but showing a modified form of bushing and screw means for wedging and dewedging the bushing.

Fig. 6 is a longitudinal section of an end portion of a pulley embodying the second mentioned species of the invention.

Referring first to the pulley shown in Figs. 1 to 4, the rim 1 thereof may be, for example, a cylindric shell of rolled steel plate made in two or more longitudinal pieces or segments joined by welding. Preferably the rim is made in two halves or complemental sections of semicircular cross-section. Fillet welds joining these sections are indicated at 2 in Fig. 2. These welds extend the full length of the rim.

Within the rim are a pair of appropriately spaced hubs 3, each in assembly with a pair of annular discs 4 and 5, the discs of each pair being spaced a substantial distance from each other. The inner discs 5 are fitted in and welded to the rim by annular fillet welds 6. The inner end portions of the hubs are slidably fitted in said inner discs. The outer discs 4 are fitted on and welded to the hubs by annular fillet welds, preferably welds 7 and 8 at opposite sides of said discs. Said outer discs are fitted in and welded to the rim by annular fillet welds 9.

The welding is done by the submerged arc process, as described in the pending application of Donald C. Currier, Serial No. 414,040, filed March 4, 1954, for Conveyor Pulleys. In this process a union of adjacent metal parts is produced by heating with an electric arc drawn between the work and a bare metal electrode consisting of a wire which as its tip melts is fed forwardly, the operation being conducted in a flux. As the wire melts, the molten filler metal is deposited in corners or interstices in the work and unites or amalgamates by fusion with adjacent metal parts to be joined.

In manufacturing the pulley, the inner discs 5 are placed in proper position in one of the two halves or segments of the rim and "tacked" thereto by welding said discs to said segment at only a few points, by small blobs of welding metal. The other rim segment is then applied and joined to the first by the welds 2 (Fig. 2), and the rim is then welded all around to said discs, making the annular welds 6. The outer discs 4 are fitted on and welded to the hubs, and the sub-assemblies comprising the hubs and outer discs are welded to the rim by the annular welds 9. These operations are comparatively simple, each annular weld being easily made while rotating the work relative to the welding arc.

If the pulley rim be made of commercial tubing, or as a shell of rolled steel plate having its longitudinal seams completed by welding before application to the discs, then in manufacturing the pulley the inner discs may be placed in proper position within the rim and welded thereto by the welds 6, after which the sub-assemblies comprising the hubs and outer discs welded thereto may be inserted in place, and the outer discs then welded to the rim by the welds 9.

As shown, the hubs 3 are rabbeted at 10 to form cylindrical end portions fitting in the bores of the inner discs and shoulders on the hubs bearing against said discs, thereby limiting inward movement of the outer discs and hubs in assembling the pulley.

The pulley is shown mounted on a shaft 11 to be rotatably supported in suitable bearings adjacent to the ends of the pulley.

The hubs 3 are interiorily tapered and arranged with their smallest inside diameter at their inner ends. For expansibility the hubs are split longitudinally from their inner ends. They may be split for their full length, but preferably are split only for the major portions of their lengths by the slots 12. Fitting in the hubs are tapered split contractible bushings 13 bored to fit the pulley shaft. As shown, the bushings are split by the slots 14. It will be understood that each hub and each bushing may be split longitudinally by one or more slots.

The bushings are connected to the hubs by screws whereby they can be forced to axial relationship to wedge the bushings between the hubs and shaft. As the angle of taper of the bushings is moderate, they can be tightly wedged by tightening the screws. In this operation, the bushings are contracted to grip the shaft, while the outward pressure of the bushings against the hubs expands them to grip the inner discs 5.

The screw means shown for wedging and dewedging the bushings are in accordance with that disclosed in patent to Firth, No. 2,402,743, of June 25, 1946, for Mountings for Sheaves, etc. As shown, each hub is connected to its bushing by a plurality of angularly spaced wedging screws 15, shown as cap screws, parallel with the hub. These screws are contained in holes therefor provided by confronting grooves in the hub and bushing, the walls of which holes are tapped or threaded only in the hub, whereby the screws are in threaded engagement only with the hub. The screw-holes are counter-bored to contain the screw heads 16, the counter-boring being of less depth in the bushing than in the hub, thereby providing thrust shoulders 17 on the bushing against which the screw-heads 16 bear. Thus the screws are tightened against said shoulders to wedge the bushing.

Upon withdrawal of the screws from the holes aforesaid, they can be operated in other holes 18 (Fig. 2) to effect dewedging of the bushing. One of the screws 15 arranged for dewedging is shown in Fig. 4. The hole therefor is formed by confronting grooves in the hub and bushing, the walls of which hole are tapped only in the bushing, so that the screw is in threaded engagement only with the bushing. The counterboring of the screw-hole is of less depth in the hub than in the bushing, thereby providing a thrust shoulder in the hub against which the screw-head bears. Both holes 18 shown in Fig. 2 are similar to that shown in Fig. 4.

Fig. 5 shows one end portion of a pulley identical to that above described except for a modification with respect to the bushings and screw means. As shown in Fig. 5, the bushing 13ª is formed on its larger end with a flange 20 connected to the hub by cap-screws 21 passing loosely through unthreaded holes in said flange and screwed into threaded holes in the hub, the heads of said screws bearing against said flange. There may be two or three or more such screws, suitably angularly spaced, though only one appears in Fig. 5. By tightening said screws against said flange, the bushing is wedged. Upon withdrawing said screws, they can be operated in other holes as jack-screws to dewedge the bushing. The type of flange and screw-means referred to are disclosed in the expired patent to Ford, No. 1,395,913, of November 1, 1921, for Hub Construction.

Fig. 6 shows one of the end portions of a pulley embodying the second mentioned species of the invention, the construction thereof being the same as in Figs. 1 to 4 except for the substitution in the pulley of Fig. 6 of unsplit hubs 3ᵇ of suitable form and wall thickness to be somewhat expansible by tight wedging of the bushings, said hubs having inner end portions of a diameter only minutely less than that of the bores of the inner discs 5 and tightly fitted in the latter. As shown in Fig. 6, the hub 3ᵇ is exteriorily tapered from its outer end portion and sufficiently thin walled for expansibility by the tight wedging of the bushings. This does not means that the walls need be unduly thin. They may be thick enough for practicable purposes.

The fit of the hubs 3ᵇ in the inner discs 5 is described in shop parlance as a line to line fit to one or two thousandths of an inch loose, meaning that the inner end portions of the hubs are of a diameter of from about two thousandths to about four thousandths of an inch less than the diameter of the bores of the inner discs. By fully tightening the screws 15, the bushings are drawn so tightly between the hubs and shaft 11 as to cause expansion of the hubs in and against the inner discs.

In manufacturing the pulley of Fig. 6, it is feasible, after the inner discs 5 are fitted in and welded to the rim, to insert the sub-assemblies comprising the hubs and outer discs welded thereto, with the hubs accurately aligned with the bores in the inner discs, so as to permit forcing the inner end portions of the hubs into said inner discs by pressing the outer discs inwardly.

It is also feasible in manufacturing the pulley to employ an alternative procedure as follows: Force the hubs into the inner discs before the rim is applied to said discs and before the outer discs are applied to the hubs. Then apply the rim to the inner discs and weld it thereto by the welds 6. Then insert the outer discs 4 into the rim and onto the hubs and weld said outer discs to the hubs by the welds 7 and to the rim by the welds 9.

In view of the alternative procedure above mentioned, it would be possible to construct a pulley of the type represented by Fig. 6 with the hubs thereof press-fitted in the inner discs, by forcing into said discs unsplit hubs having inner end portions of a diameter equal to or one or two thousandths of an inch greater than the inside diameter of said discs.

Reverting to the pulleys shown in Figs. 1 and 5, the split hubs 3 thereof have their inner end portions fitted in the inner discs with preferably a free sliding fit, making it comparatively easy to insert into place the sub-assemblies comprising the hubs and outer discs fixed thereon. The pressure with which the hubs when expanded grip the inner discs need not be excessive but only sufficient to cause solid contact of the interfitted parts.

If desired, the split hubs 3 of the pulleys shown in Figs. 1 and 5 may have their inner end portions fitted in the inner discs with a very close or tight fit, in which case expansion of the hubs by tight wedging of the bushings will cause the hubs to grip the inner discs with all the more pressure.

The hubs 3 of the pulleys shown in Figs. 1 and 5 need not be split if they be press-fitted in the inner discs, the inner end portions of the hub being originally of a diameter equal to or one or two thousandths of an inch greater than the inside diameter of said inner discs. Unsplit hubs of the form and proportions shown in these figures would be expansible at least to a minute extent by tight wedging of the bushing shown by the screw means shown.

I claim:

1. A conveyor pulley comprising a cylindric shell constituting the rim, twin hubs within the rim, two pairs of annular discs respectively connecting the respective hubs to the rim, the discs of each pair being in spaced relation and fitted on the associated hub and fitting in the rim, the outer discs of said pairs being welded to the hubs and to the rim, the inner discs of said pairs being welded only to the rim, the hubs being interiorly tapered, tapered split contractible bushings fitted in the hubs and bored to fit a shaft, and screw-means connecting each hub and bushing for forcing them to axial relationship to wedge the bushing between the hub and shaft, the hubs being expansible by wedging of the bushings to exert outward pressure in and against the inner discs.

2. A conveyor pulley comprising a cylindric shell constituting the rim, twin hubs within the rim, two pairs of annular discs respectively connecting the respective hubs to the rim, the discs of each pair being in spaced relation and fitted on the associated hub and fitting in the rim, the outer discs of said pairs being welded to the hubs and to the rim, the inner discs of said pairs being welded only to the rim, the hubs being interiorly tapered, tapered split contractible bushings fitted in the hubs and bored to fit a shaft, and screw-means connecting each hub and bushing for forcing them to axial relationship to wedge the bushing between the hub and shaft, the hubs being split longitudinally from their inner ends and expansible by wedging of the bushings to exert outward pressure in and against the inner discs.

3. A conveyor pulley comprising a cylindric shell constituting the rim, twin hubs within the rim, two pairs of annular discs respectively connecting the respective hubs to the rim, the discs of each pair being in spaced relation and fitted on the associated hub and fitting in the rim, the outer discs of said pairs being welded to the hubs and to the rim, the inner discs of said pairs being welded only to the rim, the hubs being interiorly tapered, tapered split contractible bushings fitted in the hubs and bored to fit a shaft, and screw-means connecting each hub and bushing for forcing them to axial relationship to wedge the bushing between the hub and shaft, the hubs being slidably fitted in the inner discs and split longitudinally from their inner ends and expansible by wedging of the bushing to grip said inner discs.

4. A conveyor pulley comprising a cylindric shell constituting the rim, twin hubs within the rim, two pairs of annular discs respectively connecting the respective hubs to the rim, the discs of each pair being in spaced relation and fitted on the associated hub and fitting in the rim, the outer discs of said pairs being welded to the hubs and to the rim, the inner discs of said pairs being welded only to the rim, the hubs being interiorly tapered, tapered split contractible bushings fitted in the hubs and bored to fit a shaft, and screw-means connecting each hub and bushing for forcing them to axial relationship to wedge the bushing between the hub and shaft, the hubs being tightly fitted in the inner discs and unsplit but sufficiently thin-walled to be expansible to an appreciable extent by the wedging of the bushings, whereby to cause outward pressure of the hubs in and against the inner discs when the bushings are tightly wedged.

5. A pulley according to claim 4 wherein the hubs fit in the inner discs with a line to line fit to about one or two thousandths of an inch loose.

6. A pulley according to claim 4 having the hubs press-fitted in the inner discs.

7. A conveyor pulley comprising a cylindric shell constituting the rim, twin hubs within the rim, two pairs of straight flangeless annular discs respectively connecting the respective hubs to the rim, the discs of each pair being in spaced relation and fitted on the associated hub and in the rim, the outer discs of said pairs being welded to the hubs and to the rim by annular fillet welds, the inner discs of said pairs being welded only to the rim by annular fillet welds in the anterior corners between said inner discs and the rim, the hubs being interiorly tapered, tapered split contractible bushings fitted in the hubs and bored to fit a shaft, and screw-means connecting each hub and bushing for forcing them to axial relationship to wedge the bushing between the hub and shaft, the hubs being expansible by wedging of the bushings to exert outward pressure in and against the inner discs.

References Cited in the file of this patent

UNITED STATES PATENTS

| | | |
|---|---|---|
| 1,608,207 | Gammeter | Nov. 23, 1926 |
| 1,609,377 | Millspaugh | Dec. 7, 1926 |
| 1,766,585 | Banfield, Jr., et al. | June 24, 1930 |
| 2,402,743 | Firth | June 25, 1946 |
| 2,612,395 | Russell | Sept. 30, 1952 |